United States Patent [19]
Grayson

[11] 3,927,490
[45] Dec. 23, 1975

[54] TURKEY CALL
[76] Inventor: John T. Grayson, 103 Mount Vernon Drive, Bristol, Va. 24201
[22] Filed: Feb. 12, 1975
[21] Appl. No.: 549,292

[52] U.S. Cl. .................................. 46/189; 46/191
[51] Int. Cl.² ........................................ A63H 5/00
[58] Field of Search ..................... 46/189, 178, 191

[56] References Cited
UNITED STATES PATENTS

| | | | |
|---|---|---|---|
| 2,573,856 | 11/1951 | Malone | 46/189 |
| 2,720,054 | 10/1955 | Grazier | 46/189 |
| 2,958,157 | 11/1960 | Tannehill | 46/189 |
| 3,208,154 | 9/1965 | Wisor | 46/189 |

Primary Examiner—Louis G. Mancene
Assistant Examiner—Robert F. Cutting

[57] ABSTRACT

Disclosed is a turkey call comprised of a piece of chalk in combination with a portion of appalachian red cedar having a cylindrical amplifying recess therein, a flat surface and a slot between the flat surface and the amplifying recess. The slot is partially disposed within the amplifying recess to form a passageway between the amplifying recess and the slot. The combination of the flat surface and the slot defines a sound-generating means that is contacted with the chalk to generate a turkey-attracting sound. The turkey call of this invention exhibits a combination of features which are unobvious in view of previous turkey calls.

2 Claims, 5 Drawing Figures

TURKEY CALL

This invention relates to a turkey call that exhibits a remarkable combination of features not found in previous turkey calls.

Wild turkeys have been hunted in North America since the first pilgrims landed. Although hunting turkeys is an exciting sport which has been pursued for many years, wild turkeys are very difficult to kill. Wild turkeys are difficult to kill because they are so easily alarmed it is not practical to advance upon the turkey because the noise produced by advancing upon the turkey will alarm the turkey and the turkey will leave the area. Because wild turkeys cannot be hunted by advancing on the turkey, wild turkeys are typically hunted by attracting the turkey to the hunter with a call and then killing the turkey when the turkey approaches within the area of the hunter.

Since turkeys have been hunted for many years by use of a call, numerous calls have been developed over the years. Although numerous turkey calls have been developed over the years, the previously developed turkey calls did not function idealy and always had one problem or another. The turkey call of this invention solves the problems of previous turkey calls and provides an unobvious combination of features which overcomes the problems of previous turkey calls.

The turkey call of this invention is composed of two separate parts: a striker and a sound-generating portion. These parts coact in combination to generate a turkey-attracting sound. As will be fully explained herein, the striker portion of the call comprises a suitable holder for holding a piece of chalk so as to expose and support a portion of the chalk. As also will be fully hereinafter explained, the sound-generating device is comprised of a portion of appalachian red cedar having a cylindrical amplifying recess therein. An area of the portion of appalachian red cedar is a substantially flat surface oriented parallel to the amplifying recess. The portion of appalachian red cedar has a slot disposed therein which is parallel to the substantially flat surface. The portion of the device between the substantially parallel surface and the slot forms a sound-generating means. The upper portion of the sound-generating means if a striking region. The slot is also disposed so as to intersect the amplifying recess to form a passageway between the amplifying recess and the slot. The turkey call is caused to generate a turkey-attracting sound by striking the striking region with the portion of the chalk that is exposed from the striker.

The unobvious combination of features of the turkey call of this invention can be fully appreciated by considering both the problems associated with previous turkey calls and the manner in which the turkey call of this invention overcomes the problems of previous turkey calls.

One problem with previous turkey calls was that previous turkey calls produced an unwanted noise when they were being transported during hunting. This unwanted noise often alarmed turkeys in the area and greatly reduced the possiblility of killing a turkey. The turkey call of this invention overcomes the problem of creating unwanted noise during transportation because the striker is transported within the amplifying recess of the sound-generating portion. This is accomplished by inserting the striker completely within the amplifying recess and frictionally engaging within the mouth of the amplifying recess an expansive stopper, such as a piece of sponge rubber.

Another problem with previous turkey calls was that the tone of the call could not be altered. As is well known to turkey hunters, the object of effectively using a turkey call is to reproduce precisely the sound of the particular turkey or turkeys the hunter is communicating with. Since individual turkeys have different voices of different frequency, just as do humans, the frequency of the turkey-attracting sound idealy should be adjusted to the frequency of the particular turkey or turkeys being called. The turkey call of this invention allows the frequency of the turkey-attracting sound to be altered by inserting the finger of the operator of the call into the amplifying recess. The diameter of the amplifying recess of the turkey call of this invention is in the range of ¾ to 15/16 inches. This range corresponds to the minimum and maximum diameter of the index finger of the operator of the call. If the diameter of the amplifying recess is smaller than ¾ inch, the index finger of the operator of the call cannot fit in the amplifying recess and the frequency of the call cannot be altered. If the diameter of the amplifying recess is larger than 15/16 inch, the finger of the operator of the call cannot occupy enough space in the amplifying recess to properly alter the frequency of the turkey-attracting call.

Still another problem with previous turkey calls was that only one type of call could be made. Thus, the hunter would need one type of call to generate a yelp and another type of call to generate a cluck, a putt or a whine. The turkey call of this invention is capable of producing all these types of calls by varying the length of the stroke. A long stroke gives a yelp, a short stroke gives a cluck, a sharp tap gives a putt, and a long slow stroke near the end of the striking region gives a whine.

Still another problem with previous turkey calls was that the call would emit only one single tone sound, representing the voice of a single turkey. The turkey call of the present invention will produce several different tones and thereby be made to imitate several different turkeys. Different turkeys are imitated by changing positions of the striker from the center of the striking region toward the end of the striking region. The generation of turkey-attracting sounds representing different turkeys is much more appealing to scattered birds because a single turkey will come to several birds less cautiously than to another single turkey.

Yet another problem with previous turkey calls was the reliability of the call. While previous turkey calls worked properly most of the time, occasionally the call would malfunction and emit a miscall, which was often a screech. Emission of a single miscall can alarm a turkey to such an extent that subsequent proper calls are not effective in attracting the turkey to the area of the hunter. Many previous turkey calls generated the turkey-attracting sound by contacting a wood striker to a wood striking region. The striker and the wood striking region required constant sanding and chalking. The absence of properly sanded and chalked contact surfaces, which resulted from normal operation, produced miscalls. The turkey call of this invention eliminates this problem because the turkey call of this invention is so reliable it rarely, if ever, generates a miscall. The turkey call of this invention rarely, if ever, generates a miscall because the turkey-attracing sound is generated by contacting the chalk directly to the wood of the striking region. The turkey call of this invention does not require that the striking region be sanded or chalked.

Yet another problem with previous turkey calls was that it took countless hours to master operation of the call. The turkey call of this invention eliminates this problem because the turkey call of this invention can be mastered in a few hours by anyone.

Yet another problem with previous turkey calls was that the turkey-attracting sound was not a single, clear, defined tone in the nature of a single syllable. The turkey call of this invention overcomes this problem because the turkey-attracting sound generated by the turkey call of this invention is a single, clear, distinct call which is syllable-like in character.

The turkey call of this invention can be broadly defined as a turkey call comprising A. a portion of appalachian red cedar, at least a part of the portion of appalachian red cedar comprised of red type wood, B. the portion of appalachian red cedar having a cylindrical amplifying recess therein, the axis of symmetry of the amplifying recess being positioned substantially parallel to the grain of the appalachian red cedar, the amplifying recess having a diameter in the range of ¾ to 15/16 inches and a depth in the range of 3-½ to 4-½ inches, C. the portion of appalachian red cedar having a plannar surface oriented parallel to the axis of symmetry of the amplifying recess, D. the portion of the appalachian red cedar having a slot therein, the slot being disposed between the amplifying recess and the plannar surface, the wall of the slot remote from the amplifying recess being defined by a first plane oriented parallel to the plannar surface and disposed from 0.070 to 0.090 inches from the plannar surface, the wall of the slot adjacent the amplifying recess being defined by a second plane oriented parallel to the plannar surface, the second plane being disposed from 0.080 to 0.106 inches from the first plane and a suitable distance from the axis of symmetry of the amplifying recess such that the intersection of the cylinder defining the amplifying recess and the second plane define a rectangular passageway having a long dimension parallel to the axis of symmetry of the amplifying recess and a short dimension from 7/32 to ⅝ inches, the appalachian red cedar between the first and second plane being comprised of substantially red type wood, E. the portion of appalachian red cedar having a striking region adjacent the region between the first plane and the parallel surface, the striking region being defined on one side by the first plane, the striking region being comprised of substantially red type wood, F. first and second wood damping spacers bonded into the slot disposed between the amplifying recess and the plannar surface, the first and second damping spacers being disposed at opposite ends of the slot, the grain of wood of the damping spacers being oriented substantially perpendicular to the grain of the portion of appalachian red cedar, and G. an elongated piece of chalk adapted to strike the striking region and generate a turkey-attracting sound.

The turkey call of this invention can be fully understood by considering the attached FIGURES and the description relating to the figures.

Figure 1:
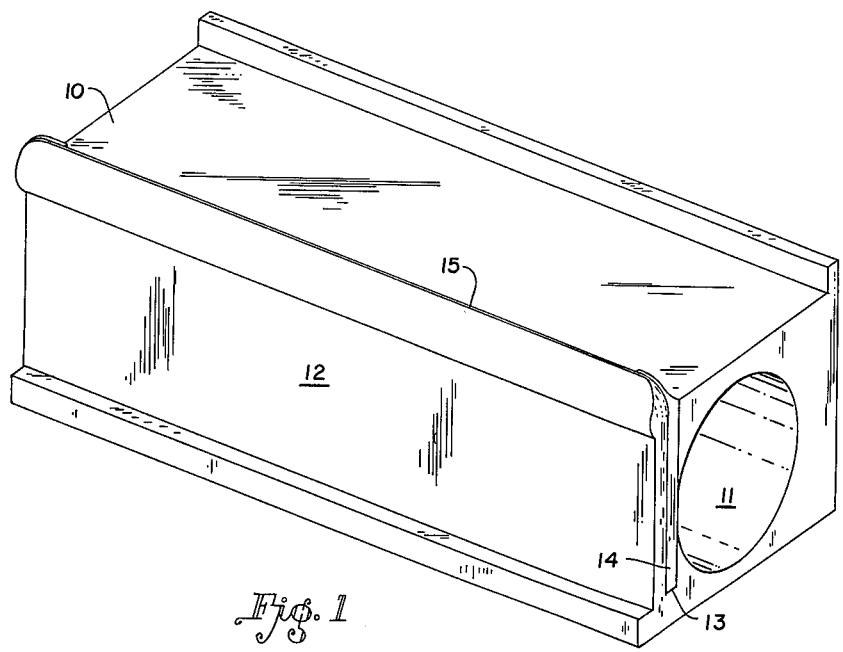
FIG. 1 is an isometric view of the sound-generating portion of the turkey call.
Figure 2:
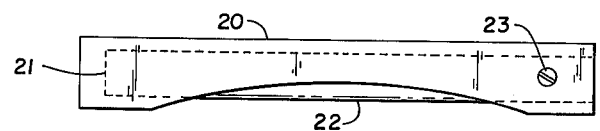
FIG. 2 is a profile view of the striker.

The turkey call can be generally understood by considering FIGS. 1 and 2.

Considering now FIG. 1, there is illustrated the sound-generating portion of the turkey call of this invention which comprises a portion of appalachian red cedar 10 having a cylindrical amplifying recess 11 therein. The sound-generating portion has a plannar surface 12 and a slot 13. Two spacers 14 are bonded into each end of slot 13. A striking region 15 is provided.

Considering now FIG. 2, there is illustrated the striker 20 having therein a cylindrical recess 21 accommodating a conventional piece of chalk 22 retained by screw 23. In a preferred embodiment, a chalk sold under the name POLYCHROME is used. This type of chalk is preferred because this type of chalk has a much longer life than other commercially available types of chalk.

The sound-generating portion and striker can be conveniently and noiselessly transported by inserting the striker within the amplifying recess and securing the striker within the amplifying recess by inserting a piece of sponge rubber in the opening of the amplifying recess.

The combination of the sound-generating portion and the striker can be used to generate a turkey-attracting sound in accordance with the following method. The sound-generating portion is held in the left hand with the striking region up and to the right. The striker is held between the thumb and index finger of the right hand with the thumb positioned slightly higher than the finger. The striker is oriented generally perpendicular to the striking region and the striking region is struck with the chalk of the striker and the turkey-attracting call is generated.

A wide variety of types of calls are possible using the turkey call of this invention. The length of the stroke determines whether a yelp, cluck, putt or whine will be generated. A long stroke generates a yelp and when done in a succession of three to seven times, the mating call of a hen is generated. The same yelp one to three times is an assembly call of scattered birds. A short stroke gives a cluck, which is used to communicate with turkeys at close range. A sharp tap gives a putt, which is used when turkeys are alarmed. A long slow stroke near the end of the striking region generates a whine, which is used in spring hunting.

By changing positions of the striker from the center to the end of the striking region, a different bird or tone can be generated. When the call is operated in this manner, it is extremely effective for scattered birds in fall hunting, for a single bird will come less cautiously to several birds than to another single bird.

By placing the fingertips at various points on the face of the plannar surface, a muffled tone can be made.

The range of the call can be increased by operating the call using increased pressure on the striker.

Figure 4:
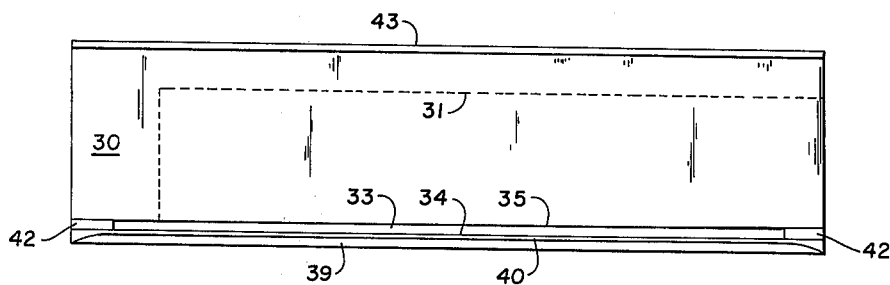
FIG. 4 is a plan view of the sound-generating portion of the turkey call.
Figure 3:
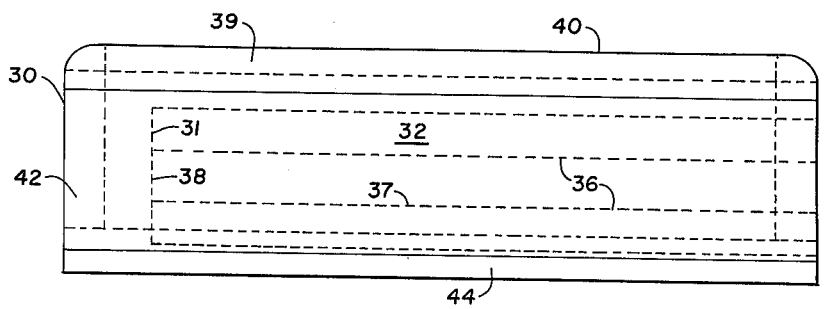
FIG. 3 is a profile view of the sound-generating portion of the turkey call.
Figure 5:
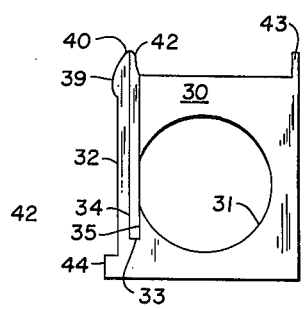
FIG. 5 is an end view of the sound-generating portion of the turkey call.

The turkey call of this invention can be understood in detail by considering FIGS. 3, 4 and 5. Considering now FIGS. 3, 4 and 5, simultaneously, the body of the turkey call is comprised of a portion of appalachian red cedar 30. At least a portion of the portion of appalachian red cedar is comprised of red type wood. In this invention, the term "appalachian red cedar" is used to describe the wood used for the sound-generating portion of the turkey call. Although not generally recognized by the general public, the wood called appalachian red cedar is not a member of the cedar family but is a member of the juniper genus of the cypress family and is classified juniperus virginiana. The wood of the juniperus virginiana is of two types: white type wood and red type wood. As will be subsequentially described in detail, certain portions of the sound-generating portion of the turkey call of this invention must be of the red type wood.

The portion of appalachian red cedar 30 has therein a cylindrical amplifying recess 31. The axis of symmetry of the amplifying recess is positioned substantially parallel to the grain of the appalachian red cedar and has a diameter in the range of ¾ to 15/16 inches and a depth in the range of 3-½ to 4-½ inches. In a preferred embodiment the diameter of the amplifying recess is about ⅞ inches and the depth is about 4 inches. As was described earlier, the index finger of the operator of the call can be inserted into the amplifying recess to alter the frequency of the turkey-attracting sound. If the diameter of the amplifying recess is smaller than ¾ inches, the finger of an average operator of the call cannot be inserted into the amplifying recess to alter the frequency of the turkey-attracting sound. If the diameter of the amplifying recess is larger than 15/16 inches, the recess is so large that the finger of the average operator will not obstruct the amplifying recess sufficiently to alter the frequency of the turkey-attracting sound.

The portion of appalachian red cedar 30 has a plannar surface 32 oriented parallel to the axis of symmetry of amplifying recess 31.

The portion of appalachian red cedar 30 has a slot 33 which extends the length of the portion and is defined by walls 34 and 35. Slot 33 is disposed between amplifying recess 31 and plannar surface 32. Wall 34 of slot 33 is disposed remote from the amplifying recess and is defined by a first plane oriented parallel to plannar surface 32. Wall 34 is disposed from 0.070 to 0.090 inches from plannar surface 32. In a preferred embodiment the first plane is disposed about 0.080 inches from plannar surface 32. Wall 35 of slot 33 is disposed adjacent the amplifying recess and is defined by a second plane oriented parallel to plannar surface 32. The second plane is disposed from 0.080 to 0.106 inches from the first plane. In a preferred embodiment the second plane is disposed about 0.093 inches from the first plane. The second plane defining wall 35 of slot 33 is disposed a suitable distance from the axis of symmetry of amplifying recess 31 such that the intersection of the cylinder defining amplifying recess 31 and the second plane defining wall 35 of slot 33 define a rectangular passageway 36 having a long dimension 37 parallel to the axis of symmetry of amplifying recess 31 and a short dimension 38 in the range of 7/32 to ⅝ inches. In a preferred embodiment long dimension 37 is in the range of ¼ to ½ inches. The wood between plannar surface 32 and wall 34 of slot 33 is comprised of red type wood.

The portion of appalachian red cedar 30 has a striking region 39 being defined on one side by the first plane defining wall 34 of slot 33. The striking region is also comprised of substantially red type wood. The top 40 of striking region 39 is struck with the chalk to generate the turkey-attracting sound.

First and second damping spacers 42 are adhesively bonded into slot 33 and disposed at opposite ends of slot 33. The grain of the wood of damping spacers 42 is oriented substantially perpendicular to the grain of the wood in the portion of appalachian red cedar 30.

Damping spacers 42 are a very important part of the sound-generating portion of the turkey call of this invention. The damping spacers contribute to the turkey-attracting quality of the sound generated by the operator of the turkey call by damping the vibration of the wood between parallel surface 32 and wall 34 of slot 33. This vibration damping effect produces a clear distinct note in the nature of a single syllable, which is extremely appealing to turkeys.

Projections 43 and 44 assist in holding the sound-generation portion of the turkey call during operation.

The invention has been described in considerable detail with particular reference to certain preferred embodiments thereof, but it will be understood that variations and modifications can be effected within the spirit and scope of the invention as described above and as defined in the appended claims.

I claim:
1. A turkey call comprising
   A. a portion of appalachian red cedar, at least a part of the portion of appalachian red cedar comprised of red type wood,
   B. the portion of appalachian red cedar having a cylindrical amplifying recess therein, the axis of symmetry of the amplifying recess being positioned substantially parallel to the grain of the appalachian red cedar, the amplifying recess having a diameter in the range of ¾ to 15/16 inches and a depth in the range of 3-½ to 4-½ inches,
   C. the portion of appalachian red cedar having a plannar surface oriented parallel to the axis of symmetry of the amplifying recess,
   D. the portion of appalachian red cedar having a slot therein, the slot being disposed between the amplifying recess and the plannar surface, the wall of the slot remote from the amplifying recess being defined by a first plane oriented parallel to the plannar surface and disposed from 0.070 to 0.090 inches from the plannar surface, the wall of the slot adjacent the amplifying recess being defined by a second plane oriented parallel to the plannar surface, the second plane being disposed from 0.080 to 0.106 inches from the first plane and a suitable distance from the axis of symmetry of the amplifying recess such that the intersection of the cylinder defining the amplifying recess and the second plane define a rectangular passageway having a long dimension parallel to the axis of symmetry of the amplifying recess and a short dimension from 7/32 to ⅝ inches, the appalachian red cedar between the first and second plane being comprised of substantially red type wood,
   E. the portion of appalachian red cedar having a striking region adjacent the region between the first plane and the parallel surface, the striking region being defined on one side by the first plane, the striking region being comprised of substantially red type wood,

F. first and second wood damping spacers bonded into the slot disposed between the amplifying recess and the plannar surface, the first and second damping spacers being disposed at opposite ends of the slot, the grain of the wood of the damping spacers being oriented substantially perpendicular to the grain of the portion of appalachian red cedar, and G. an elongated piece of chalk adapted to strike the striking region and generate a turkey-attracting sound.

2. A turkey call comprising

A. a portion of appalachian red cedar, at least a part of the portion of appalachian red cedar comprised of red type wood, B. the portion of appalachian red cedar having a cylindrical amplifying recess therein, the axis of symmetry of the amplifying recess being positioned substantially parallel to the grain of the appalachian red cedar, the amplifying recess having a diameter of about ⅞ inches and a depth of about 4 inches, C. the portion of appalachian red cedar having a plannar surface oriented parallel to the axis of symmetry of the amplifying recess, D. the portion of appalachian red cedar having a slot therein disposed between the amplifying recess and the plannar surface, the wall of the slot remote from the amplifying recess being defined by a first plane oriented parallel to the plannar surface and disposed about 0.080 inches from the plannar surface, the wall of the slot adjacent the amplifying recess being defined by a second plane oriented parallel to the plannar surface, the second plane being disposed about 0.093 inches from the first plane and a suitable distance from the axis of symmetry of the amplifying recess such that the intersection of the cylinder defining the amplifying recess and the second plane define a rectangular passageway having a long dimension parallel to the axis of symmetry of the amplifying recess and a short dimension from ¼ to ½ inches, the appalachian red cedar between the first and second plane being comprised of substantially red type wood, E. the portion of appalachian red cedar having a striking region adjacent the region between the first plane and the parallel surface, the striking region being defined on one side by the first plane, the striking region being comprised of substantially red type wood, F. first and second wood damping spacers bonded into the slot disposed between the amplifying recess and the plannar surface, the first and second damping spacers being disposed at opposite ends of the slot, the grain of the wood of the damping spacers being oriented substantially perpendicular to the grain of the portion of appalachian red cedar, and G. an elongated piece of chalk adapted to strike the striking region and generate a turkey-attracting sound.

\* \* \* \* \*